United States Patent [19]

Evans et al.

[11] Patent Number: 6,138,024
[45] Date of Patent: Oct. 24, 2000

[54] DYNAMIC CHANNEL SELECTION IN A CELLULAR COMMUNICATION SYSTEM

[75] Inventors: Michael W. Evans, Forest; Eric Rubin, Huddleston; Mark Sihlanick, Lynchburg, all of Va.

[73] Assignee: Allen Telecom Inc., Solon, Ohio

[21] Appl. No.: 08/956,662

[22] Filed: Oct. 23, 1997

[51] Int. Cl.$^7$ ............................. H04Q 7/22; H04Q 7/20
[52] U.S. Cl. .......................................... 455/452; 455/448
[58] Field of Search ................................ 455/434, 452, 455/448, 426, 62, 400, 34.1

[56] References Cited

U.S. PATENT DOCUMENTS

| | | | |
|---|---|---|---|
| 4,144,412 | 3/1979 | Ito et al. | 179/2 EB |
| 4,481,670 | 11/1984 | Freeburg | 455/33 |
| 4,485,486 | 11/1984 | Webb et al. | 455/33 |
| 4,597,105 | 6/1986 | Freeburg | 455/33 |
| 4,696,027 | 9/1987 | Bonta | 379/60 |
| 4,736,453 | 4/1988 | Schloemer | 455/33 |
| 4,737,978 | 4/1988 | Burke et al. | 379/60 |
| 4,794,635 | 12/1988 | Hess | 379/60 |
| 4,831,373 | 5/1989 | Hess | 340/825.03 |
| 4,870,408 | 9/1989 | Zdunek et al. | 340/825.03 |
| 4,965,850 | 10/1990 | Schloemer | 455/33 |
| 5,034,993 | 7/1991 | Sasuta et al. | 455/11 |
| 5,038,399 | 8/1991 | Bruckert | 455/33 |
| 5,040,238 | 8/1991 | Comroe et al. | 455/33 |
| 5,093,926 | 3/1992 | Sasuta | 455/34 |
| 5,142,691 | 8/1992 | Freeburg et al. | 455/38 |
| 5,185,739 | 2/1993 | Spear | 370/95.3 |
| 5,203,012 | 4/1993 | Patsiokas | 455/34.1 |
| 5,206,882 | 4/1993 | Schloemer | 375/1 |
| 5,210,786 | 5/1993 | Itoh | 379/59 |
| 5,212,805 | 5/1993 | Comroe et al. | 455/33.1 |
| 5,222,249 | 6/1993 | Carney | 455/33.2 |
| 5,241,685 | 8/1993 | Bodin | 455/56.1 |
| 5,260,944 | 11/1993 | Tomabechi | 370/95.1 |
| 5,280,630 | 1/1994 | Wang | 455/56.1 |
| 5,309,503 | 5/1994 | Bruckert et al. | 379/60 |
| 5,504,803 | 4/1996 | Yamada et al. | 379/59 |
| 5,574,977 | 11/1996 | Joseph | 455/58.1 |
| 5,625,878 | 4/1997 | Lopponen | 455/34.1 |
| 5,655,217 | 8/1997 | Lemson | 455/513 |
| 5,732,348 | 3/1998 | Norimatsu | 455/434 |
| 5,732,353 | 3/1998 | Haartsen | 455/450 |
| 5,832,384 | 11/1998 | Balachandran | 455/450 |
| 5,835,859 | 11/1998 | Doner | 455/447 |

FOREIGN PATENT DOCUMENTS

PCT/US93/ 06226  6/1993  WIPO .

OTHER PUBLICATIONS

Katzela I. And M. Naghshineh, Channel Assignment Schemes for Cellular Mobile Telecommunication Systems: A Comprehensive Survey, *IEEE Personal Communications*, Jun. 1996, pp. 10–31.

Avery, John, Standard Serves In–Building Microcellular PCS, *Microwaves & RF*, May 1995, pp. 8, 10, 12 and 40.

*Primary Examiner*—Daniel S. Hunter
*Assistant Examiner*—Nick Corsaro
*Attorney, Agent, or Firm*—Laff, Whitesel & Saret, Ltd.

[57] ABSTRACT

A method of selecting allocated communication channels for use by a cellular auxiliary personal communication system (CAPCS) comprising periodically collecting relative signal strength indication (RSSI) measurements for all allocated communication channels, periodically determining the estimated expected probability of non-interference for each allocated communication channel based on the relative signal strength indication measurements and selecting an available allocated communication channel having the highest estimated expected probability of non-interference for use by the CAPCS system. The relative signal strength indication measurements are made on the allocated communication channels by measuring the signal on the allocated communication channel when no call is being carried by the CAPCS on that channel. The estimated expected probability of non-interference for each allocated communication channel also takes into consideration the received signal strength indication measurements on adjacent allocated communication channels and allocated communication channels in the same group.

53 Claims, 4 Drawing Sheets

DYNAMIC CHANNEL SELECTION IN A CELLULAR COMMUNICATION SYSTEM

BACKGROUND OF THE INVENTION

The present invention relates to methods for dynamically selecting channels in a cellular communication system. More specifically, the present invention relates to methods for dynamically selecting channels in which received signal strength indication measurements are periodically taken on each channel when the channel is not in use and an estimated expected relative probability of non-interference of the measured channels is determined based on the received signal strength indication measurements.

In conventional cellular communication systems (hereinafter sometimes referred to for convenience as "macrocells", or as "existing cellular systems"), the voice channels used for the various cells in the system are selected and controlled manually. Existing cellular systems are not static; they evolve. For example, new cells are added, existing cells are sectorized, the transmit power level of cells are changed, and more channels are added to select cells. Channel plans for entire systems may have to be adapted to accommodate these changes. This might happen as often as once per month in some systems.

Some conventional cellular communication systems may employ mechanisms to detect interference on given channels. If that occurs, channel equipment is shut down, and the interference noted. Most conventional cellular communication systems employ fixed tuned combiners, which must be manually tuned. However, even self-tuning combiners impose severe restrictions on the channel combinations that can be used. Therefore, conventional cellular communication systems typically do not have the capability of automatically selecting new channels on which to operate.

Cellular Auxiliary Personal Communication Systems ("CAPCS") are deployed into this dynamic, changing environment to provide "personal" service to CAPCS subscribers within buildings. A typical CAPCS comprises a CAPCS transceiver, a CAPCS base station connected to a PBX in a building and a plurality of CAPCS subscriber units. The PBX is generally connected to the public switched telephone network. Thus, the CAPCS base station provides the interface between a CAPCS subscriber unit and the building's conventional telephone system.

CAPCS generally use the same frequency band as conventional cellular communication systems. Because CAFCS subscribers in a building are located relatively close to the CAPCS transceiver, CAPCS can operate at lower power levels than conventional cellular communication systems. The lower power levels also help insure that the CAPCS does not interfere with surrounding conventional cellular communication systems.

The deployment of numerous such systems, can result in combinations too complex for effective manual channel planning. Even if manual planning could be performed, the increase in the equipment that would have to be manually changed makes that task more and more difficult.

Because the CAPCS transmits at lower power levels and employs linear combiners, the controlling mechanism for a CAPCS can easily change the transmit frequencies. Also, with available broadband combiners, the transmit frequencies can be spaced closer than those in conventional cellular communication systems.

Generally, manufacturers of CAPCS employ some mechanism to detect channel interference and select a new channel. One example of such system is described by John Avery in a May, 1995 article published in the trade magazine "Microwaves & RF". The system described by Avery seems to be concerned with establishing the daily pattern of activity that might be expected on a macrocell channel, (a channel used by an existing conventional cellular system), and then selecting channels for the CAPCS based on this pattern of activity to avoid interference. Apparently, this system presumes that there is correlation between probability that a macrocell channel will be used and the time of day at which it will be used.

This might be true in some installations. For example, if the CAPCS "views" a macrocell that serves a freeway, it may be that the channels used by the macrocell that cover the freeway are more available during non-rush hours. However, for this to be true, the CAPCS must presume that channels used by other macrocells are available during rush hours.

Accordingly a need arises for an improved method for selecting channels in a CAPCS.

SUMMARY OF THE INVENTION

In accordance with the present invention, in a first cellular communication system having a set of allocated communication channels for transmitting and receiving communication signals in a geographic area and in which a second cellular communication system has a set of assigned channels for transmitting and receiving in the same geographic area, some of the assigned channels being the same as the allocated communication channels, a method of selecting an available allocated communication channel for use in transmitting and receiving communication signals in the first cellular communication system, comprising the steps of:

in the first cellular communication system periodically sensing and measuring received signal strength indication data on each then available allocated communication channels;

storing the sensed and measured data for each allocated communication channel;

periodically determining from the stored sensed and measured data the estimated expected probability of non-interference for each allocated communication channel relative to other allocated communication channels; and selecting for use by the first cellular communication system an available allocated communication channel from the set of allocated communication channels based on the estimated expected probability of non-interference. In a preferred embodiment, the first cellular communication system is a cellular auxiliary personal communication system (CAPCS) and the second cellular communication system is a convention cellular communication system. The allocated communication channels may be voice channels or control channels or both.

Preferably, the available allocated communication channel with the highest estimated expected probability of non-interference which is not adjacent to an allocated communication channel in use by the first cellular communication system is selected. In one form, the set of allocated communication channels is divided into a plurality of groups, and the estimated expected probability of non-interference for an allocated communication channel in a group is determined in part based on the received signal strength indication data for all allocated communication channels in the group. The estimated expected probability of non-interference for an allocated communication channel in the group is desirably adjusted by a group improvement factor or a group degradation factor. In a preferred embodiment, the received signal strength indication data is sensed and measured over a period of time and stored in an RSSI database, and the estimated expected probability of non-interference for each allocated communication channel is based upon at least a portion of the stored data.

The method may further comprise the step of suspending the periodic sensing and measuring step during periods of low activity in the second cellular communication system.

The method may also determine the occurrence of channel assignment changes in the second cellular communication system, and in response to that determination, may suspend the selecting step, delete the stored received signal strength indication data for all allocated communication channels, and then reactivate the sensing, storing, determining, and selecting steps.

In a most preferred form, the estimated expected probability of non-interference for an allocated communication channel is based on the received signal strength indication data for the allocated communication channel, on the received signal strength indication data for the allocated communication channel adjacent to and above the allocated communication channel and on the received signal strength indication data for the allocated communication channel adjacent to and below the allocated communication channel.

In yet another form of the invention, a method of dynamic channel selection is provided for a first cellular communication system having a set of allocated communication channels for transmitting and receiving communication signals in a geographic area and in which a second cellular communication system has a set of assigned channels for transmitting and receiving in the same geographic area, some of the assigned channels being the same as the allocated communication channels, the allocated communication channels including allocated voice channels and allocated control channels, the method of selecting an available allocated communication channel for use in transmitting and receiving communication signals in the first cellular communication system comprising the steps of in the first cellular communication system, periodically collecting received signal strength indication measurements on each then available allocated communication channel, periodically determining the estimated expected probability of non-interference for each allocated communication channel based on the received signal strength indication measurements, and selecting for use by the first cellular communication system an available allocated communication channel having the highest estimated expected probability of non-interference.

In one embodiment, the allocated communication channels are allocated voice channels comprising forward voice channels each operating on a first frequency split and reverse voice channels each operating on a second frequency split. In this embodiment, the step of periodically collecting received signal strength indication measurements comprises collecting received signal strength indication measurements for each reverse voice channel on each corresponding first frequency split and collecting received signal strength indication measurements for said forward voice channel on each corresponding second frequency split. The estimated expected probability of non-interference for each allocated voice channels is based on the received signal strength indication measurements collected on the corresponding first and second frequency splits.

The collected received signal strength indication measurements taken on each first frequency split are recorded over an extended period of time into a first split RSSI database and the collected received signal strength indication measurements taken on each second frequency split are recorded over an extended period of time into a second split RSSI database and the estimated expected probability of non-interference for each allocated voice channel is based upon at least a portion of the recorded first frequency split received signal strength indication measurements and at least a portion of the recorded second frequency split received signal strength indication measurements. In one form, the set of allocated voice channels are divided into a plurality of groups and the estimated expected probability of non-interference for an allocated voice channel in a group is based upon at least a portion of the recorded first frequency split received signal strength indication measurements and at least a portion of the recorded second frequency split received signal strength indication measurements for all allocated voice channels in the group.

In another form, the allocated communication channels are allocated control channels. The allocated control channels include one allocated control channel in use by the first cellular communication system and at least one available allocated control channel. In this form, the selecting step further comprises periodically replacing the one allocated control channel with an available allocated control channel based on the estimated expected probability of non-interference of the available allocated control channels.

In a preferred form, the estimated expected probability of non-interference for each allocated communication channel is determined according to the following formula:

$$HLEPNI_x = HEPNI_x * AHEPHI_{x-1} * AHEPNI_{x+1} * LEPNI_x * ALEPNI_{x-1} * ALEPNI_{x+1}$$

WHERE:

$HLEPNI_x$ is the estimated expected probability of non-interference (EPNI) for allocated communication channel X;

$HEPNI_x$ is the EPNI for allocated communication channel X as indicated by first frequency split measurements taken on allocated communication channel X;

$AHEPNI_{x-1}$ is the EPNI for allocated communication channel X as indicated by first frequency split measurements taken on the adjacent allocated communication channel below allocated communication channel X;

$AHEPNI_{x+1}$ is the EPNI for allocated communication channel X as indicated by first frequency split measurements taken on the adjacent allocated communication channel above allocated communication channel X;

$LEPNI_x$, is the EPNI for allocated communication channel X as indicated by second frequency split measurements taken on allocated communication channel X;

$ALEPNI_{x-1}$ is the EPNI for allocated communication channel X as indicated by second frequency split measurements taken on the adjacent allocated communication channel below allocated communication channel X; and $ALEPNI_{x+1}$ is the EPNI for allocated communication channel X as indicated by second frequency split measurements taken on the adjacent allocated communication channel above allocated communication channel X.

In these ways and others, in accordance with the present invention, channels can be dynamically and optimally selected. Further objects, features and advantages of the present invention will become apparent from the following description and drawings.

DETAILED DESCRIPTION OF THE INVENTION

In accordance with the present invention, a method of dynamic channel selection in a cellular communication system is described that provides distinct advantages when compared to those of the prior art. The invention can best be understood with reference to the accompanying drawing figures.

Figure 1:
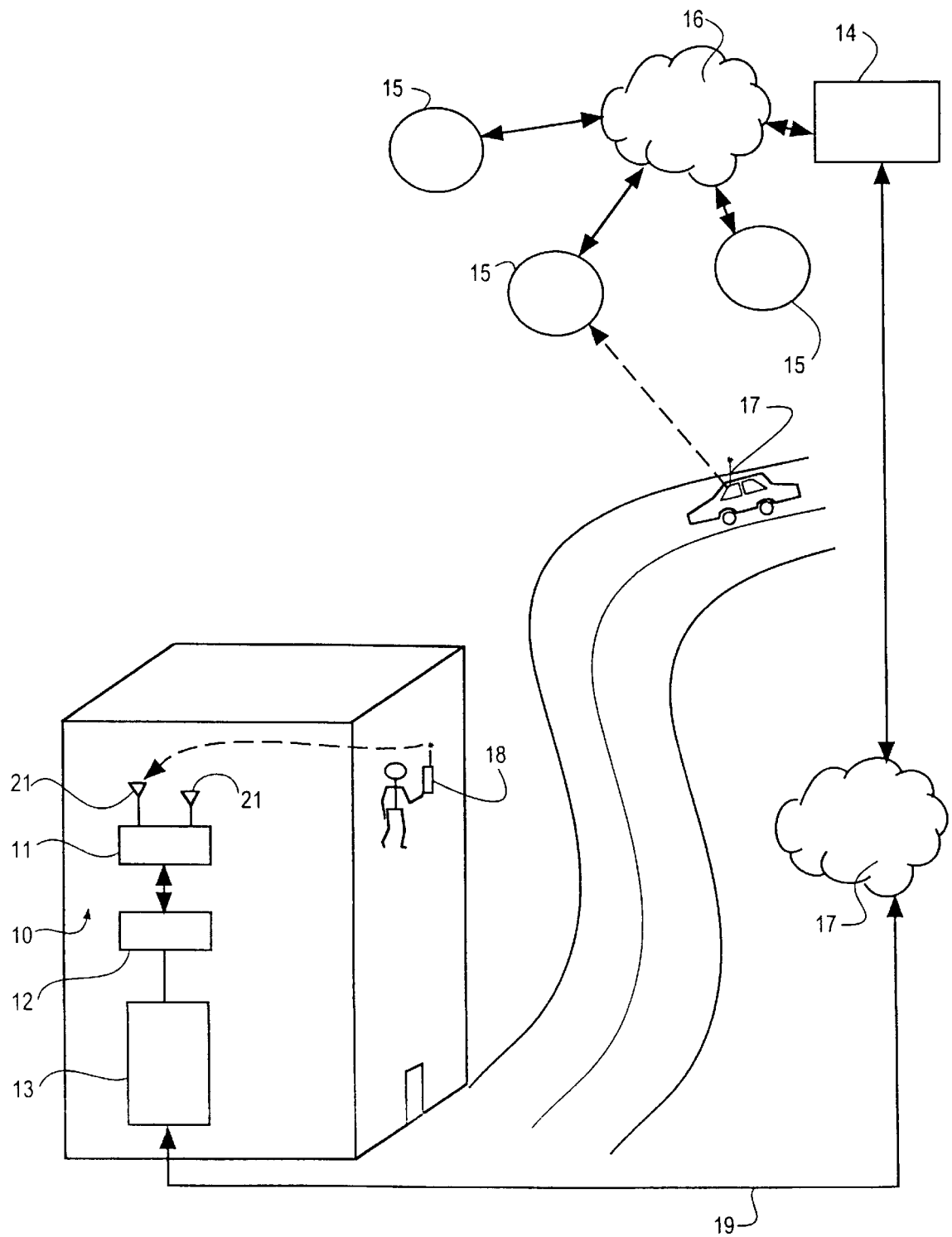
FIG. 1 is a schematic diagram of a cellular auxiliary personal communications system in an environment including an existing conventional cellular communication system.

Referring now to the drawings, FIG. 1 shows a cellular auxiliary personal communication system ("CAPCS"), generally designated at 10. The CAPCS 10 comprises a CAPCS transceiver 11, having antennas 21, and a CAPCS base station 12 connected to a building PBX 13 inside a building 23. The building PBX 13 is typically connected to the public switched telephone network (PSTN) 17 via communications line 19. The CAPCS transceiver 11 receives communication signals from mobile CAPCS subscriber units 18 on allocated communication channels and relays the signals to the building PBX 13 via the CAPCS base station 12 where they are routed to their intended destination.

Communications between the CAPCS transceiver 11 and the CAPCS subscriber unit 18 is established on an available allocated communication channel. Each allocated communication channel is divided into a channel pair consisting of a first frequency split and a second frequency split. Typically the first frequency split is the high frequency split, or forward channel, which carries signals from the CAPCS transceiver 11 to the mobile CAPCS subscriber unit 18. The second frequency split is the low frequency split, or reverse channel, which carries signals from the CAPCS subscriber unit 18 to the CAPCS transceiver 11. In a preferred embodiment, the high frequency split and low frequency split are 45 MHz apart.

Typical voice communications during a call are carried on an allocated voice channel. Voice channel signals from the CAPCS transceiver 11 to the CAPCS subscriber unit 18 are carried on the forward voice channel, or high frequency split. Voice channel signals from the CAPCS subscriber unit 18 to the CAPCS transceiver 11 are carried by the reverse voice channel, or low frequency split.

Before an allocated voice channel is selected to carry a call, an exchange between the CAPCS transceiver 11 and CAPCS subscriber unit 18 occurs over an allocated control channel. Control channel signals sent from the CAPCS transceiver 11 to the CAPCS subscriber unit 18 are carried by the forward control channel, or high frequency split. Control channel signals sent from the CAPCS subscriber unit 18 to the CAPCS transceiver 11 are carried by the reverse control channel, or low frequency split.

In a conventional cellular communications system, the macrocells use assigned channels in groups. The assigned channels in each group are separated by twenty-one. Thus, one group may comprise the $1^{st}$, $22^{nd}$, $43^{rd}$, etc. voice channels. Thus, there is an advantage in grouping the allocated communication channels in a CAPCS into groups.

The level of interference on one allocated communication channel in a CAPCS in a group, tells one something about interference on the other allocated communication channels in the group.

CAPCS 10 coexists with conventional cellular communication systems comprising macrocells 15 having a plurality of assigned channels some of which may be the same as the allocated communication channels in CAPCS 10. For the sake of clarity, channels used by the macrocell system are referred to herein as assigned channels and channels used by the CAPCS are referred to herein as allocated communication channels. The macrocells 15 are connected to a mobile switching center 14 via a network 16. The mobile switching center 14 is also connected to the PSTN 17. Conventional cellular telephones 17 communicate with macrocells 15 using the same frequencies as those used by CAPCS 10, thus creating the chance for interference.

Figure 2:
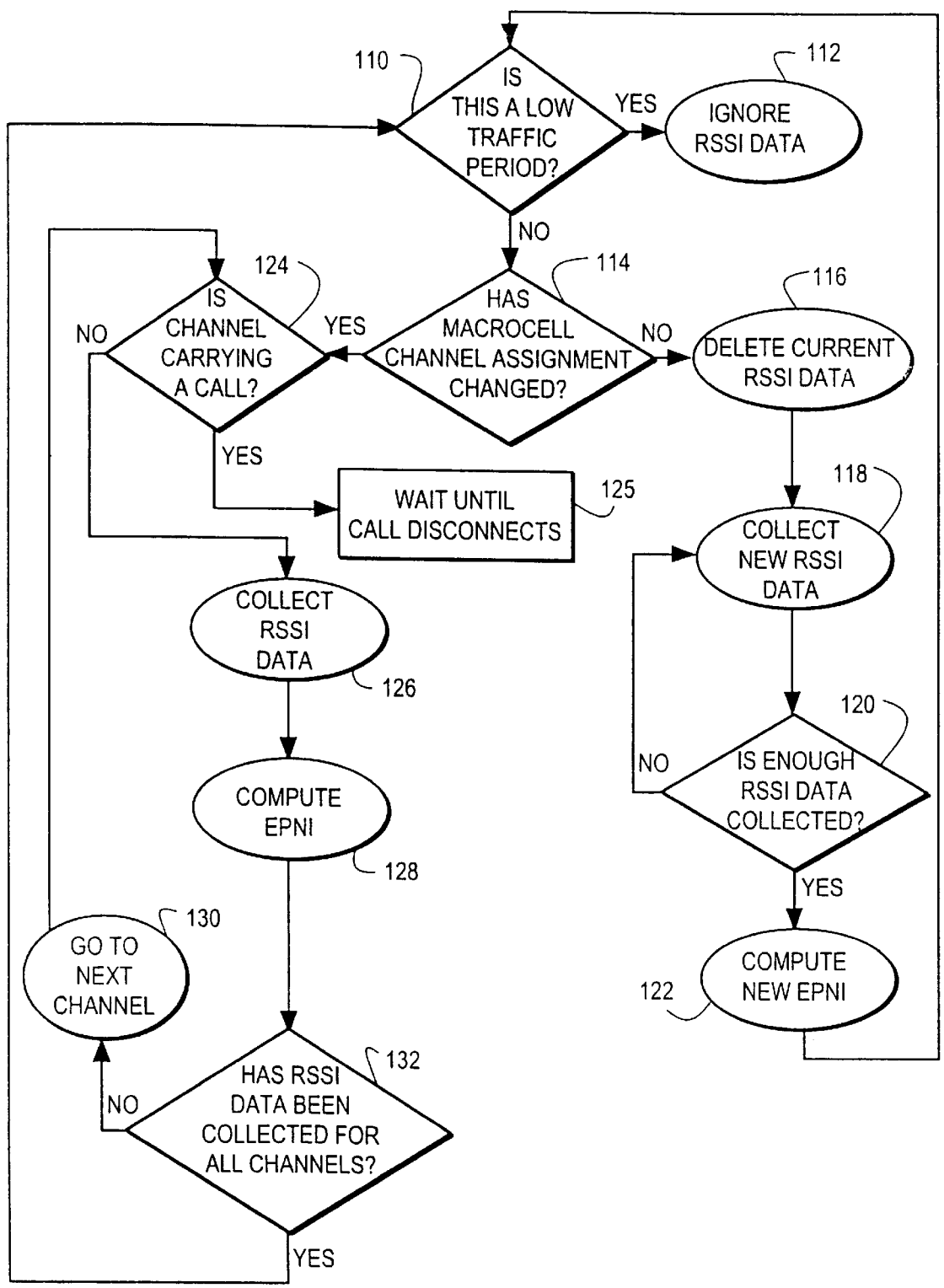
FIG. 2 is a flowchart showing the modes of operation of a method of dynamic channel selection according to the present invention.
Figure 3:
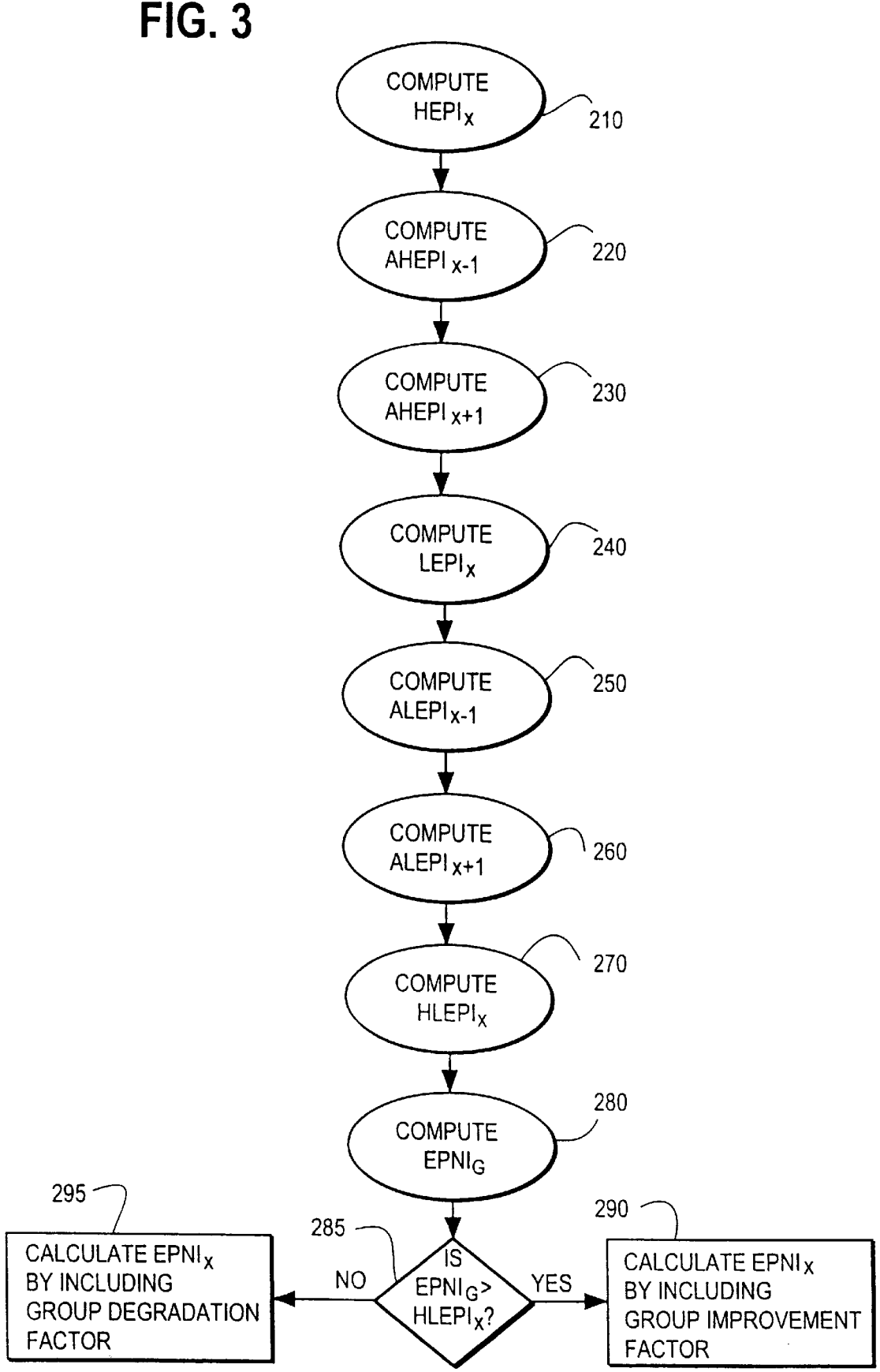
FIG. 3 is a flowchart showing the process flow of an expected probability of non-interference calculation routine.
Figure 4:
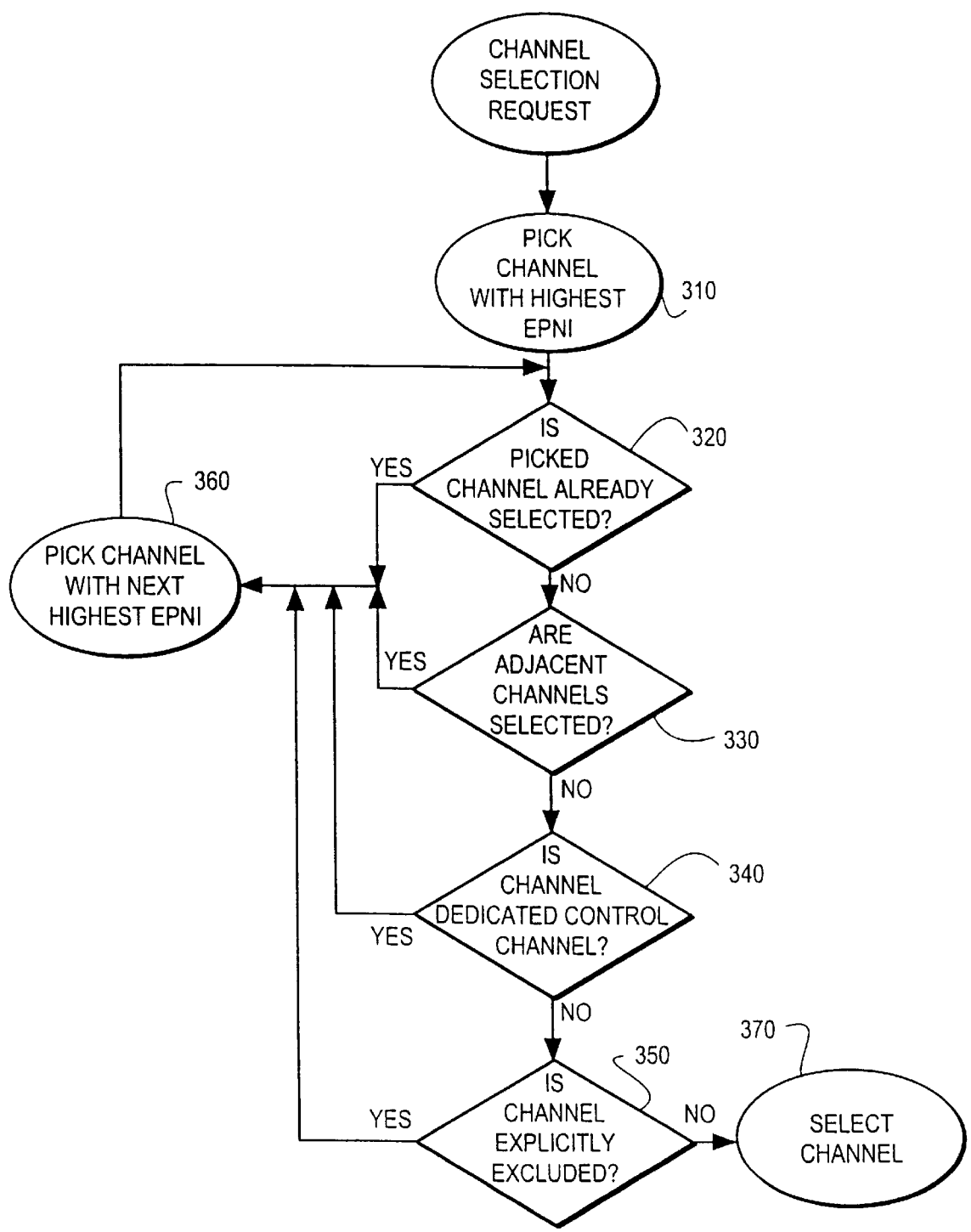
FIG. 4 is a flowchart showing the channel selection process flow of a method of dynamic channel selection according to the present invention.

A method of dynamically selecting channels in a CAPCS according to the present invention is shown in FIG. 4. FIG. 2 shows the process flow of the different modes of operation of a method according to the present invention and FIG. 3 shows a method of calculating the estimated expected probability of non-interference of each allocated communication channel in the CAPCS according to the present invention. A method according to the present invention selects the available allocated communication channels which, if used by the CAPCS 10, would result in the highest probability that interference will not occur. Interference is defined in the subject application as an undesired signal close in strength to the strength of a desired signal.

A method according the present invention comprises periodically collecting received signal strength indication ("RSSI") measurements for each available allocated communication channel in the CAPCS, periodically computing an estimated expected probability of non-interference of each allocated communication channel, and selecting an available allocated communication channel which has the highest expected probability of non-interference. In the preferred embodiment, a method according to the present invention is embodied in software which runs on a microprocessor located in the CAPCS base station 12.

The main inputs for the method of the present invention are RSSI measurements taken in the low frequency split or mobile transmit frequency band and measurements taken in the high frequency split or base station transmit frequency band. These RSSI measurements are taken for all allocated communication channels for which the CAPCS operator is licensed. Thus, the step of collecting RSSI measurements comprises collecting low frequency split RSSI measurements for each allocated communication channel and collecting high frequency split RSSI measurements for each allocated communication channel.

The low frequency split measurements are collected by using existing voice channel receivers that do not happen to be carrying a call to monitor the allocated communication channels which are not currently carrying a call. Allocated communication channels which are not currently carrying a call are referred to herein as available allocated communication channels. There is no dedicated "scanning receiver". The RSSI measurement capability is part of the transceiver design, and is required for other reasons.

The high frequency split measurements are performed by a "test transceiver" of a type currently in use in existing conventional cellular communication systems. Such a test transceiver transmits in the low frequency split frequency range and receives in the high frequency split frequency range. One function of the test transceiver is to test the voice transceivers. Typically, there is one test transceiver per eight voice transceivers. For the high frequency split RSSI measurements, a separate antenna is connected to the test transceiver.

Since the selection scheme of the present invention uses capability that is needed to establish calls, it can be easily installed in existing systems. This fact also makes the selection scheme of the present invention very cost effective.

One reality of RSSI measurement which impacts the implementation in a fundamental way is that the CAPCS base station 12 must be careful to report measurements taken only on available allocated communication channels (i.e., channels not being used for a CAPCS call). During a call, the RSSI measurement indicates the strength of the desired signals, not the interfering signals. Thus, it is essential to only take measurements on available allocated communication channels.

RSSI measurements are collected and stored in a very long buffer. In a preferred embodiment, 1024 low frequency split and 1024 high frequency split measurements are stored for each allocated communication channel. In essence, the present invention estimates an underlying stochastic process by sampling that process. In order to properly rank the allocated communication channels, approximately 100 levels or discrete values are needed to be able to quantize a probability to 1%. A stochastic process with true underlying probability of event x occurring of 1% of the time requires an estimated 1000 samples to predict accurately the 1%. Stated differently, if several runs of 1000 samples are conducted on a 1% stochastic process, on average, there will be 10 hits. However, some runs will have 7 hits; some runs will have 12 hits, so the estimates about the process will vary slightly. Thus, if a random process is sampled enough times to get ten expected hits, the prediction will be fairly accurate most of the time.

Another consideration governing the data collection process is how often to sample a given allocated communication channel. In a preferred embodiment of the present invention, a one minute interval is appropriate to obtain independent samples. Since it is desired that 1024 samples will encompass a fairly large portion of the day, one minute is used because 1024 minutes is roughly 17 hours which covers a large portion of the day.

An algorithm according to the present invention requires that measurements be taken on the selected channels even in times of heavy call activity. Otherwise the algorithm ceases to generate up-to-date information about the selected channels. For that reason, the present invention provides RSSI measurements on all of the currently selected channels after the call carried by the selected channel is completed. Even in times of heavy call traffic, when it is impossible to collect an RSSI measurement for each allocated communication channel every minute, (because some allocated communication channels will be in use by the CAPCS) at least one measurement between calls is taken.

The expected probability of non-interference of an allocated communication channel is an estimate of the relative probability that interference will not occur. It is an "estimate" because the method according to the present invention is looking at samples of an underlying stochastic process. It is "relative" because not enough data is known to compute an exact probability; however, the method computes estimates which are relatively significant, channel to channel.

The RSSI measurements that are collected infer something about the ones which are not collected, since the transmission medium is reciprocal. In the end, a "relative" indication is all that is needed, since the method chooses the best available allocated communication channel.

The step of periodically determining the expected probability of non-interference for each allocated communication channel comprises computing a high/low expected probability of non-interference for each allocated communication channel as well as computing a group expected probability of non-interference for each allocated communication channel group.

The high/low expected probability of non-interference for an allocated communication channel X ("HLEPNI$_x$") is the estimated expected probability of non-interference ("EPNI") if channel X is used in the CAPCS as indicated by RSSI measurements taken on allocated communication channel X and the allocated communication channels above and below allocated communication channel X. HLEPNI$_x$ is computed by multiplying several subfactors, which themselves are probability estimates. Note that for the purposes of the equation below, the probabilities are considered to range from 0 to 1, whereas, elsewhere probabilities that are in percentages may be considered. Thus, the probability of non-interference for each of the allocated communication channels is determined by the following formula:

$$HLEPNI_x = HEPNI_x * AHEPHI_{x-1} * AHEPNI_{x+1} * LEPNI_x * ALEPNI_{x-1} * ALEPNI_{x+1}$$

where:

HEPNI$_x$ is the EPNI for allocated communication channel X as indicated by high frequency split measurements taken on allocated communication channel X.

AHEPNI$_{x-1}$ is the EPNI for allocated communication channel X as indicated by high frequency split measurements taken on the adjacent allocated communication channel below allocated communication channel X.

AHEPNI$_{x+1}$ is the EPNI for allocated communication channel X as indicated by high frequency split measurements taken on the adjacent allocated communication channel above allocated communication channel X.

LEPNI$_x$, ALEPNI$_{x-1}$ and ALEPNI$_{x+1}$ are EPNI as indicated by low frequency split measurements for allocated communication channel X and the allocated communication channels adjacent to X.

EPNI$_x$ is the EPNI for allocated communication channel X based on the HLEPNI$_x$. EPNI$_x$ can also be adjusted according to the HLEPNI for all the allocated communication channels in the same group as channel X. To compute EPNI$_x$, first a group EPNI (EPNI$_G$) is computed by averaging the HLEPNI for all the allocated communication channels in the group, excluding the allocated communication channels with the highest and lowest HLEPNI's. EPNI$_x$ is computed from HLEPNI$_x$ and EPNI$_G$ using the following formula:

If $HLEPNI_X$ is < $EPNI_G$,
$$EPNI_X = HLEPNI_X + ((EPNI_G - HLEPN_X)* \text{ group improvement factor})$$
If $HLEPNI_X$ is > $EPNI_G$,
$$EPNI_X = HLEPNI_X - ((HLEPNI_X - EPNI_G)* \text{ group degradation factor})$$

In the above equations, group improvement factor and group degradation factor are parameters which may be assigned to control how much a group's EPNI influences an individual allocated communication channel's EPNI. These factors are predefined by the system operator. For example, if both group improvement factor and group degradation factor are assigned a value of 1.0, then the $EPNI_x$ for all the allocated communication channels in the group is the same, and is equal to $EPNI_G$. At the other extreme, if group improvement factor and group degradation factor are both 0, then $EPNI_x$ is not influenced by the group $EPNI_G$.

Referring now to FIG. 3, it is seen that the step of computing the probability of non-interference of each allocated communication channel in the CAPCS comprises computing the $HEPNI_x$ for that allocated communication channel 210, computing the $AHEPHI_{x-1}$ for that allocated communication channel 220, computing the $AHEPNI_{x+1}$ for that allocated communication channel 230, computing the $LEPNI_x$ for that allocated communication channel 240, computing the $ALEPNI_{x-1}$ for that allocated communication channel 250, computing the $ALEPNI_{x+1}$ for that allocated communication channel 260, computing the $HLEPNI_x$ for that allocated communication channel 270, computing the $EPNI_G$ for that allocated communication channel 280. $HLEPNI_x$ is then compared to $EPNI_G$ 285. If the $EPNI_G$ is greater than $HLEPNI_x$, a group improvement factor is factored into the calculation of $EPNI_x$ 290. If $EPNI_G$ is less than $HLEPNI_x$, a group degradation factor is factored into the calculation of $EPNI_x$ 295.

By having separate factors for improvement and degradation, the algorithm may be adjusted to allow a bad overall group EPNI to pull down a relatively good individual allocated communication channel EPNI more than a good group EPNI will pull up a relatively poor individual allocated communication channel EPNI.

This is a quantification of the following approach. If there is a bad group of allocated communication channels, it may be desirable to avoid using all the allocated communication channels in the group, even the ones that look relatively good individually. It may be that the ones that appear to be good have not been sampled often enough. If there is a good group of allocated communication channels, with a few poor individuals, it may be desirable to use the good allocated communication channels in the group and to avoid using the poor ones.

Applying the RSSI measurements for channel X to HPNI (RSSI), $HEPNI_x$ is computed. HPNI is a function that computes the probability of non-interference given that an allocated communication channel is used for a call while a given high frequency split RSSI is being experienced from a macrocell on that allocated communication channel. In the preferred embodiment, the HPNI function is implemented as a look up table.

The look-up table correlates measurable RSSI values to HPNI values. The HPNI values are adjustable (by a human operator) to accommodate various field conditions. In the preferred embodiment, the −40 to −120 dBm range of measurable RSSI values is divided into 16 sections each covering 5 dBm. For each section, a value of HPNI is assigned. The value represents the relative probability that interference will not occur if the CAPCS uses an available allocated communication channel while a high frequency split RSSI in the range of the associated section is being experienced. For example, it would be logical to assign values of 100% to the −115 to −120 range, and perhaps to the −110 to −115 range. This would be saying it is 100% probable that interference will not occur if an available allocated communication channel was used while the RSSI from the macrocell in the high frequency split was between −110 and −120. The value for the −40 to −45 range would be close to 0%. The values between the extremes would decrease monotonically with increasing RSSI values.

$HEPNI_x$ is determined by finding the maximum value of HPNI (RSSI) for all the last used values of high frequency split RSSI measurements taken for allocated communication channel X. The high frequency split measurements are from the macrocell sites, which have a fixed location. So, the RSSI reading will likely be −120 dBm if a call is not up on the macrocell channel at the cell site, and will be something else if a call is up. The probability that a call is up on a given assigned channel in the macrocell site is fairly uniform from assigned channel to assigned channel. That is, all the macrocells experience roughly the same number of calls, and the calls are equally divided among the assigned channels. So, in the end, when ranking the allocated communication channels, it does not matter that the ranking mechanism includes information about the probability that a macrocell call is up or not, since the probability will be the same from assigned channel to assigned channel on the macrocell.

The number of high frequency split value measurements used in determining $HEPNI_x$ can be adjusted to use less than all the data collected to accommodate the CAPCS environment. For example, using all of the high frequency split value measurements, 1024 measurements taken 1 per minute in the preferred embodiment, provides relatively accurate $HEPNI_x$ estimates. However, at 1 measurement per minute, it takes about 17 hours to collect 1024 measurements. Thus, the method may be slow to react to changes. In situations where it is desirable to have the method react to changes quicker, the number of high frequency split value measurements used may be reduced, at the expense of having less high frequency split value measurement information to make the $KEPNI_x$ estimate. In the preferred embodiment, 120 measurements are used.

$AHEPNI_{x-1}$ is determined using a function designated as AHPNI(RSSI), which returns the probability of not causing interference on allocated communication channel X given a RSSI measurement on the allocated communication channel adjacent to channel X. This function, like HPNI(RSSI), is implemented by dividing the readable RSSI range into 16 sections, and assigning a value to each of the sections. In general, the values for AHPNI(RSSI) for a given RSSI level will be much higher than for HPNI(RSSI) for that same RSSI.

$AHEPNI_{x-1}$ is determined by finding the maximum value of AHPNI(RSSI) for all the last used values of high frequency split RSSI measurements taken for the allocated communication channel adjacent to and lower than allocated communication channel X.

$AHEPNI_{x+1}$ is determined by finding the maximum value of AHPNI(RSSI) for all the last used values of high frequency split RSSI measurements taken for the allocated communication channel adjacent to and higher than allocated communication channel X.

$LEPNI_x$ is determined using a function designated as LPNI(RSSI), which returns the probability of not causing interference given that an allocated communication channel is used for a call while a low frequency split RSSI as passed is being experienced. This function is implemented by dividing the −40 to −120 dBm range of measurable values of RSSI into 16 sections each covering 5 dBm. For each section, a value of LPNI is assigned. The value represents the relative probability that interference will not occur if the CAPCS uses an allocated communication channel while a low frequency split RSSI in the range of the associated section is being experienced.

$LEPNI_x$ is determined by averaging the values of LPNI (RSSI) for all the last used values of low frequency split RSSI measurements taken for allocated communication channel X. The average is used for the low frequency split while the maximum is used for the high frequency split because the low frequency split measurements are caused by interference from the macrocell system cellular telephone 17 which do not have a fixed location. Therefore, the RSSI reading will depend upon where the macrocell system cellular telephones 17 making the call is located within the macrocell site. By averaging the LPNI's, the average or mean probability that interference will not occur is computed.

The number of low frequency split value measurements used in determining $LEPNI_x$ can be adjusted to use less than all the data collected to accommodate the CAPCS environment. For example, using all of the low frequency split value measurements, 1024 measurements taken 1 per minute in the preferred embodiment, provides relatively accurate $LEPNI_x$ estimates. However, at 1 measurement per minute, it takes about 17 hours to collect 1024 measurements. Thus, the method may be slow to react to changes. In situations where it is desirable to have the method react to changes quicker, the number of low frequency split value measurements used may be reduced, at the expense of having less low frequency split value measurement information to make the $HEPNI_x$ estimate. In the preferred embodiment, all 1024 measurements are used.

It will be desirable to use a greater number of low frequency split value measurements than high frequency split value measurements, since there tends to be a greater variation in the probability of non-interference based on the low frequency split value measurements.

$ALEPNI_{x-1}$ is determined using a function designated as ALPNI(RSSI), which returns the probability of not causing interference on allocated communication channel X given a RSSI measurement on the allocated communication channel adjacent to allocated communication channel X. This function is implemented by dividing the readable RSSI range into 16 sections, and assigning a value to each of the sections. In general, the values for ALPNI(RSSI) for a given RSSI level will be much higher than for LPNI(RSSI) for that same RSSI.

$ALEPNI_{x-1}$ is determined by finding the average of the values of ALPNI(RSSI) for all the last used values of low frequency split RSSI measurements taken for the allocated communication channel adjacent to and lower than allocated communication channel X.

$ALEPNI_{x+1}$ is determined by finding the average of the values of ALPNI(RSSI) for all the last used values of low frequency split RSSI measurements taken for the allocated communication channel to adjacent and higher than allocated communication channel X.

So, the function $EPNI_x$ quantitatively incorporates the qualitative ideas about how RSSI measurements should influence the probability of non-interference indication for an allocated communication channel. It is important to realize that this function $EPNI_x$ is carefully constructed so that it is an indication of probability that interference will not occur with or from the outside macrocell system.

There is little information incorporated in $EPNI_x$ as to whether using channel X in the CAPCS will cause interference with or from other allocated communication channels in the CAPCS itself. The occurrence of self-interference within the CAPCS is something that the CAPCS itself controls in accordance with nonself-interference rules applied when determining which allocated communication channel to select. These rules or criteria are:

a selected allocated communication channel cannot be equal or adjacent to any already selected allocated communication channel in the CAPCS;

a selected allocated communication channel cannot be a dedicated control channel;

a selected allocated communication channel cannot be explicitly excluded by the CAPCS operator.

As shown in FIG. 4 the channel selection process in the CAPCS comprises picking the allocated communication channel with the highest EPNI (310), determining if the picked allocated communication channel is already selected (320), determining if the picked allocated communication channel is adjacent to an allocated communication channel already selected (330), determining if the picked allocated communication channel is a dedicated control channel (340) and determining if the picked allocated communication channel is explicitly excluded (350). If the answer to any of questions 320–350 is yes, a new allocated communication channel with the next highest EPNI is picked (360) and steps 320–350 are repeated for the newly picked channel. If the answers to 320–350 are all no, then the picked allocated communication channel is selected (370). The term selected is used herein to describe an allocated communication channel which is currently carrying a CAPCS call.

The system according to the present invention operates in 3 possible modes: redeploy mode, refine choices mode, and low traffic mode. The refine choices mode is the normal operating mode described above. In the refine choices mode, the method according to the present invention is collecting data, evaluating $EPNI_x$, and optimizing allocated communication channel selection. Since EPNI for the allocated communication channels changes as data comes in, sometimes currently selected allocated communication channels must be abandoned for better ones.

The redeploy mode is entered when the method detects (or is informed by the operator) that the macrocell channel assignment has been changed. In this case, the RSSI data in the buffers is no longer valid. In this mode, the method empties the buffers (deletes the stored data) at the beginning of redeploy mode, and begins accumulating new RSSI data. The method does not select new channels while in redeploy mode. Rather, it continues to collect data for a period of time that may be specified by the CAPCS operator. After that, the method returns to normal operation by entering the refine choice mode.

The method detects that the macrocell channel assignment has changed as follows. While operating in the refine choices mode, the method monitors the EPNIs of the allocated communication channels. If the best allocated communication channels' EPNIs undergo a sudden overall decrease, this is an indication that something has changed in the macrocell. The reason is that if the RSSI buffers incorporate information from 2 different macrocell channel assignments, all allocated communication channels will begin to appear to be poor choices. This is because the EPNI function is deliberately pessimistic, especially in terms of its evaluation of high frequency split measurements.

The low traffic mode may be used in times in which call activity in the macrocell will be low, for example on nights and weekends. In the low traffic mode, incoming RSSI measurements are ignored. The low traffic mode is included because it is likely that low call activity will tend to make more and more of the allocated communication channels' EPNIs move towards 1.0, if that RSSI data were to be considered.

FIG. 2 shows the different modes of operation according to the present invention. As mentioned above, the method determines if it is currently operating in a low traffic period (110). If the method is operating in a low traffic period the method ignores RSSI data (112). If the method is not operating in a low traffic mode, the method determines if the macrocell channel assignment has changed (114). The macrocell channel assignment may be detected as described previously or by notification from the system operator.

If the macrocell channel assignment has changed, the method enters the redeploy mode. In the redeploy mode, the stored RSSI data is deleted (116). Then new RSSI data is collected for all allocated communication channels (118). The method continues collecting RSSI data for a specified period of time until enough data is collected to make accurate EPNI computations (120). Once sufficient data has been collected, new EPNI data is calculated for all allocated communication channels (122) and the method exits redeploy mode.

If the macrocell channel assignment has not changed, the method enters the refine choices mode. In the refine choices mode, the system continues periodically collecting RSSI data and updating EPNI information for all the allocated communication channels. Before collecting RSSI data for an allocated communication channel, the method determines if the allocated communication channel is currently carrying a call (124). If the allocated communication channel is not carrying a call, RSSI data is collected for that allocated communication channel (126). If the allocated communication channel is carrying a call, the method waits until the call is disconnected (125) and then collects RSSI data for that allocated communication channel (126).

After RSSI data is collected 126 for an allocated communication channel (126), the EPNI for the channel is recalculated (128). The method then determines if RSSI data has been collected for all allocated communication channels (132). If it has not, the method moves to the next allocated communication channel (130) and returns to step 124. If RSSI data has been collected for all allocated communication channels, the method returns to step 110.

The above-described method is particularly suited for selecting voice channels. However, this method is generally not well suited for selecting control channels because once an allocated control channel is selected, it will always be transmitting. Thus, it is not possible to assess the EPNI of the selected control channel (unless the group improvement and degradation factors are close to 1.0). Therefore, a separate method for selecting allocated control channels is provided.

In the method for selecting allocated control channels, RSSI information is collected for all possible dedicated allocated control channels which are not in use. No RSSI information for the currently selected control channel will be valid, since it is always transmitting.

At an operator specified time of day, the EPNIs for the available allocated control channels are evaluated. The available allocated control channel with the best EPNI, not considering the currently selected control channel, and subject to the "control channel criteria" is selected. The CAPCS will then begin transmitting on the newly selected control channel, and method will be free to collect data on the formerly selected control channel. It is expected that the selected control channel will alternate between the two best choices.

To accommodate the fact that the macrocell channels may change, the method swaps the currently selected control channel for a new available allocated control channel with the best EPNI at a CAPCS operator specificable time after redeploy mode is entered.

The "control channel criteria", like the voice channel criteria, is a set of rules defining which new allocated control channel is selected. They are as follows:
  a selected control channel must be a dedicated allocated control channel;
  a selected control channel cannot be explicitly excluded by the CAPCS operator.

There is no adjacency rule applied to the allocated control channel selection process. This is because it is acceptable if a newly selected control channel is adjacent to the currently selected one. If the selected control channel happens to be adjacent to a selected voice channel, that voice channel will be abandoned.

It will be apparent to those skilled in the art that modifications may be made without departing from the spirit and scope of the invention. Accordingly, it is not intended that the invention be limited except as may be necessary in view of the appended claims.

What is claimed is:

1. In a first cellular communication system having a set of allocated communication channels for transmitting and receiving communication signals in a geographic area and in which a second cellular communication system has a set of assigned channels for transmitting and receiving in the same geographic area, some of said assigned channels being the same as said allocated communication channels, a method of selecting an available allocated communication channel for use in transmitting and receiving communication signals in said first cellular communication system, comprising the steps of:

in said first cellular communication system periodically sensing and measuring received signal strength indication data on each then available allocated communication channel;

storing said sensed and measured data for each allocated communication channel;

periodically determining from said stored sensed and measured data the estimated expected probability of non-interference for each allocated communication channel relative to others of said allocated communication channels;

selecting for use by said first cellular communication system an available allocated communication channel from said set of allocated communication channels based on the estimated expected probability of non-interference;

determining the occurrence of channel assignment changes in said second cellular communication system;

in response to said determination, suspending said selecting step, deleting said stored received signal strength indication data for all allocated communication channels, and, thereafter, reactivating said sensing, storing, determining and selecting steps.

2. The method of claim 1 wherein the selecting step comprises selecting an available allocated communication channel with the highest estimated expected probability of non-interference.

3. The method of claim 1 wherein the selecting step further comprises selecting an available allocated communication channel which is not adjacent to an allocated communication channel which is then in use by the first cellular communication system.

4. The method of claim 1 wherein:
the set of allocated communication channels is divided into a plurality of groups, and
wherein the estimated expected probability of non-interference for an allocated communication channel in a group is determined in part based on the received signal strength indication data for all allocated communication channels in said group.

5. The method of claim 4 wherein the estimated expected probability of non-interference for an allocated communication channel in said group is adjusted by a group improvement factor or a group degradation factor.

6. The method of claim 1 further comprising the steps of:
sensing and measuring said received signal strength indication data over a period of time and storing said sensed and measured data in an RSSI database; and
determining said estimated expected probability of non-interference for each allocated communication channel based upon at least a portion of said stored data.

7. The method of claim 1 further comprising the step of:
suspending said periodic sensing and measuring step during periods of low activity in said second cellular communication system.

8. The method of claim 1 and wherein said allocated communication channels include a plurality of allocated control channels and comprising the step of:
periodically determining from said stored sensed and measured data the estimated expected probability of non-interference for each available allocated control channel.

9. The method of claim 8 wherein said plurality of allocated control channels include one allocated control channel in use by said first cellular communication system and at least one available allocated control channel; and
during its period of use, suspending the periodic sensing and measuring step for said one allocated control channel.

10. The method of claim 9 further comprising the step of periodically replacing in said first cellular communication system said one allocated control channel with an available allocated control channel based on the estimated expected probability of non-interference of the available allocated control channels.

11. The method of claim 1 wherein the estimated expected probability of non-interference for an allocated communication channel is based on the received signal strength indication data for the allocated communication channel, on the received signal strength indication data for the allocated communication channel adjacent to and above the allocated communication channel and on the received signal strength indication data for the allocated communication channel adjacent to and below the allocated communication channel.

12. The method of claim 1 wherein the estimated expected probability of non-interference for each allocated communication channel is determined according to the following formula:

$$HLEPNI_x = HEPNI_x * AHEPHI_{x-1} * AHEPNI_{x+1} * LEPNI_x * ALEPNI_{x-1} * ALEPNI_{x+1}$$

WHERE:
$HLEPNI_x$ is the estimated expected probability of non-interference (EPNI) for allocated communication channel X;
$HEPNI_x$ is the EPNI for allocated communication channel X as indicated by first frequency split measurements taken on allocated communication channel X;
$AHEPNI_{x-1}$ is the EPNI for allocated communication channel X as indicated by first frequency split measurements taken on the adjacent allocated communication channel below allocated communication channel X;
$AHEPNI_{x+1}$ is the EPNI for allocated communication channel X as indicated by first frequency split measurements taken on the adjacent allocated communication channel above allocated communication channel X;
$LEPNI_x$, is the EPNI for allocated communication channel X as indicated by second frequency split measurements taken on allocated communication channel X;
$ALEPNI_{x-1}$ is the EPNI for allocated communication channel X as indicated by second frequency split measurements taken on the adjacent allocated communication channel below allocated communication channel X; and
$ALEPNI_{x+1}$ is the EPNI for allocated communication channel X as indicated by second frequency split measurements taken on the adjacent allocated communication channel above allocated communication channel X.

13. The method of claim 1 wherein said first cellular communication system comprises a cellular auxiliary personal communication system and said second cellular communication system comprises a convention cellular communication system.

14. In a first cellular communication system having a set of allocated communication channels for transmitting and receiving communication signals in a geographic area and in which a second cellular communication system has a set of assigned channels for transmitting and receiving in the same geographic area, some of said assigned channels being the same as said allocated communication channels, the allocated communication channels including allocated voice channels and allocated control channels, a method of selecting an available allocated communication channel for use in transmitting and receiving communication signals in said first cellular communication system, comprising the steps of:
in said first cellular communication system, periodically collecting received signal strength indication measurements on each then available allocated communication channel over an extended period of time and storing said measurements in an RSSI database;
periodically determining the estimated expected probability of non-interference for each allocated communication channel based upon at least a portion of said collected and stored received signal strength indication measurements;
selecting for use by said first cellular communication system an available allocated communication channel having the highest estimated expected probability of non-interference;
determining channel assignment changes in said second cellular communication system;
in response to said determination, suspending said selecting step and deleting said recorded received signal strength indication measurements for all allocated communications channels from said RSSI database and then reactivating said collecting, determining and selecting steps.

15. The method of claim 14 wherein the selecting step further comprises selecting an available allocated communication channel with the highest estimated expected probability of non-interference and which is not adjacent to an allocated communication channel then in use by the first cellular communication system.

16. The method of claim 14 wherein the set of the allocated communication channels is divided into a plurality of groups, and wherein:
the estimated expected probability of non-interference for an allocated communication channel in a group is based in part on the received signal strength indication measurements for all allocated communication channels in said group.

17. The method of claim 16 wherein the estimated expected probability of non-interference for an allocated communication channel in said group is adjusted by a group improvement factor or a group degradation factor.

18. The method of claim 14 wherein said allocated voice channels comprise forward voice channels each operating on a first frequency split and reverse voice channels each operating on a second frequency split and wherein the step of periodically collecting further comprises:
collecting received signal strength indication measurements for each said reverse voice channel on each corresponding first frequency split; and
collecting received signal strength indication measurements for each said forward voice channel on each corresponding second frequency split;
wherein said estimated expected probability of non-interference for each allocated voice channel is based on said received signal strength indication measurements collected on said corresponding first and second frequency splits.

19. The method of claim 18 wherein said collected received signal strength indication measurements taken on each first frequency split are recorded over an extended period of time into a first split RSSI database and said collected received signal strength indication measurements taken on each second frequency split are recorded over an extended period of time into a second frequency split RSSI database; and
said estimated expected probability of non-interference for each allocated voice channel is based upon at least a portion of said recorded first frequency split received signal strength indication measurements and at least a portion of said recorded second frequency split received signal strength indication measurements.

20. The method of claim 18 wherein said set of allocated voice channels are divided into a plurality of groups; and
wherein the estimated expected probability of non-interference for an allocated voice channel in a group is based upon at least a portion of said recorded first frequency split received signal strength indication measurements and at least a portion of said recorded second frequency split received signal strength indication measurements for all allocated voice channels in said group.

21. The method of claim 14 further comprising the steps of:
suspending said periodic collecting step during periods of low activity in said second cellular communication system.

22. The method of claim 14 wherein said allocated control channels include one allocated control channel in use by said first cellular communication system and at least one available allocated control channel.

23. The method of claim 22 wherein said selecting step further comprises periodically replacing said one allocated control channel with an available allocated control channel based on the estimated expected probability of non-interference of the available allocated control channels.

24. The method of claim 14 wherein the estimated expected probability of non-interference for an allocated communication channel is based on the received signal strength indication measurements for the allocated communication channel, on the received signal strength indication measurements for an allocated communication channel adjacent to and above the allocated communication channel and on the received signal strength indication measurements for an allocated communication channel adjacent to and below the allocated communication channel.

25. The method of claim 14 wherein the estimated expected probability of non-interference for each allocated communication channel is determined according to the following formula:

$$HLEPNI_x = HEPNI_x * AHEPHI_{x-1} * AHEPNI_{x+1} * LEPNI_x * ALEPNI_{x-1} * ALEPNI_{x+1}$$

WHERE:

$HLEPNI_x$ is the estimated expected probability of non-interference (EPNI) for allocated communication channel X;

$HEPNI_x$ is the EPNI for allocated communication channel X as indicated by first frequency split measurements taken on allocated communication channel X;

$AHEPNI_{x-1}$ is the EPNI for allocated communication channel X as indicated by first frequency split measurements taken on the adjacent allocated communication channel below allocated communication channel X;

$AHEPNI_{x+1}$ is the EPNI for allocated communication channel X as indicated by first frequency split measurements taken on the adjacent allocated communication channel above allocated communication channel X;

$LEPNI_x$, is the EPNI for allocated communication channel X as indicated by second frequency split measurements taken on allocated communication channel X;

$ALEPNI_{x-1}$ is the EPNI for allocated communication channel X as indicated by second frequency split measurements taken on the adjacent allocated communication channel below allocated communication channel X; and $ALEPNI_{x+1}$ is the EPNI for allocated communication channel X as indicated by second frequency split measurements taken on the adjacent allocated communication channel above allocated communication channel X.

26. The method of claim 14 wherein said first cellular communication system comprises a cellular auxiliary personal communication system and said second cellular communication system comprises a conventional cellular communication system.

27. In a first cellular communication system having a set of allocated communication channels for transmitting and receiving communication signals in a geographic area and in which a second cellular communication system has a set of assigned channels for transmitting and receiving in the same geographic area, some of said assigned channels being the same as said allocated communication channels, a method of selecting an available allocated communication channel for use in transmitting and receiving communication signals in said first cellular communication system, comprising the steps of:

in said first cellular communication system periodically sensing and measuring received signal strength indication data on each then available allocated communication channel;

storing said sensed and measured data for each allocated communication channel;

periodically determining from said stored sensed and measured data the estimated expected probability of non-interference for each allocated communication channels;

selecting for use by said first cellular communication system an available allocated communication channel from said set of allocated communication channels based on the estimated expected probability of non-interference;

wherein the estimated expected probability of non-interference for each allocated communication channel is determined according to the following formula:

$$HLEPNI_X = HEPNI_X * AHEPNI_{X-1} * AHEPNI_{X+1} * LEPNI_X * ALEPNI_{X-1} * ALEPNI_{X+1}$$

WHERE:

$HLEPNI_X$ is the estimated expected probability of non-interference (EPNI) for allocated communication channel X;

$HEPNI_X$ is the EPNI for allocated communication channel X as indicated by first frequency split measurements taken on allocated communication channel X;

$AHEPNI_{X-1}$ is the EPNI for allocated communication channel X as indicated by first frequency split measurements taken on the adjacent allocated communication channel below allocated communication channel X;

$AHEPNI_{X+1}$ is the EPNI for allocated communication channel X as indicated by first frequency split measurements taken on the adjacent allocated communication channel above allocated communication channel X;

$LEPNI_X$ is the EPNI for allocated communication channel X as indicated by second frequency split measurements taken on allocated communication channel X;

$ALEPNI_{X-1}$ is the EPNI for allocated communication channel X as indicated by second frequency split measurements taken on the adjacent allocated communication channel below allocated communication channel X; and $ALEPNI_{X+1}$ is the EPNI for allocated communication channel X as indicated by second frequency split measurements taken on the adjacent allocated communication channel above allocated communication channel X.

28. The method of claim 27 wherein the selecting step comprises selecting an available allocated communication channel with the highest estimated expected probability of non-interference.

29. The method of claim 27 wherein the selecting step further comprises selecting an available allocated communication channel which is not adjacent to an allocated communication channel which is then in use by the first cellular communication system.

30. The method of claim 27 wherein:

the set of allocated communication channels is divided into a plurality of groups, and wherein the estimated expected probability of non-interference for an allocated communication channel in a group is determined in part based on the received signal strength indication data for all allocated communication channels in said group.

31. The method of claim 30 wherein the estimated expected probability of non-interference for an allocated communication channel in said group is adjusted by a group improvement factor or a group degradation factor.

32. The method of claim 27 further comprising the steps of:

sensing and measuring said received signal strength indication data over a period of time and storing said sensed and measured data in an RSSI database; and determining said estimated expected probability of non-interference for each allocated communication channel based upon at least a portion of said stored data.

33. The method of claim 27 further comprising the steps of:

suspending said periodic sensing and measuring step during periods of low activity in said second cellular communication system.

34. The method of claim 27 further comprising the steps of:

determining the occurrence of channel assignment changes in said second cellular communication system;

in response to said determination, suspending said selecting step, deleting said stored received signal strength indication data for all allocated communication channels, and, thereafter, reactivating said sensing, storing, determining and selecting steps.

35. The method of claim 27 and wherein said allocated communication channels include a plurality of allocated control channels and comprising the step of:

periodically determining from said stored sensed and measured data the estimated expected probability of non-interference for each available allocated control channel.

36. The method of claim 35 wherein said plurality of allocated control channels include one allocated control channel in use by said first cellular communication system and at least one available allocated control channel; and during its period of use, suspending the periodic sensing and measuring step for said one allocated control channel.

37. The method of claim 36 further comprising the step of periodically replacing in said first cellular communication system said one allocated control channel with an available allocated control channel based on the estimated expected probability of non-interference of the available allocated control channels.

38. The method of claim 27 wherein the estimated expected probability on non-interference for an allocated communication channel is based on the received signal strength indication data for the allocated communication channel, the received signal strength indication data for the allocated communication channel adjacent to and above the allocated communication channel and on the received signal strength indication data for the allocated communication channel adjacent to and below the allocated communication channel.

39. The method of claim 27 wherein said first cellular communication system comprises a cellular auxiliary personal communication system and said second cellular communication system comprises a convention cellular communication system.

40. In a first cellular communication system having a set of allocated communication channels for transmitting and receiving communication signals in a geographic area and in which a second cellular communication system has a set of assigned channels for transmitting and receiving in the same geographic area, some of said assigned channels being the same as said allocated communication channels, the allocated communication channels including allocated voice channels and allocated control channels, a method of selecting an available allocated communication channel for use in transmitting and receiving communication signals in said first cellular communication system, comprising the steps of:

in said first cellular communication system, periodically collecting received signal strength indication measurements on each then available allocated communication channel;

periodically determining the estimated expected probability of non-interference for each allocated communication channel based on said received signal strength indication measurements;

selecting for use by said first cellular communication system an available allocated communication channel having the highest estimated expected probability of non-interference;

wherein the estimated expected probability of non-interference for each allocated communication channel is determined according to the following formula:

$$HLEPNI_X = HEPNI_X * AHEPNI_{X-1} * AHEPNI_{X+1} * LEPNI_X * ALEPNI_{X-1} * ALEPNI_{X+1}$$

WHERE:

$HLEPNI_X$ is the estimated expected probability of non-interference (EPNI) for allocated communication channel X;

$HEPNI_X$ is the EPNI for allocated communication channel X as indicated by first frequency split measurements taken on allocated communication channel X;

$AHEPNI_{X-1}$ is the EPNI for allocated communication channel X as indicated by first frequency split measurements taken on the adjacent allocated communication channel below allocated communication channel X;

$AHEPNI_{X+1}$ is the EPNI for allocated communication channel X as indicated by first frequency split measurements taken on the adjacent allocated communication channel above allocated communication channel X;

$LEPNI_X$ is the EPNI for allocated communication channel X as indicated by second frequency split measurements taken on allocated communication channel X;

$ALEPNI_{X-1}$ is the EPNI for allocated communication channel X as indicated by second frequency split measurements taken on the adjacent allocated communication channel below allocated communication channel X; and $ALEPNI_{X+1}$ is the EPNI for allocated communication channel X as indicated by second frequency split measurements taken on the adjacent allocated communication channel above allocated communication channel X.

41. The method of claim 40 wherein the selecting step further comprises selecting an available allocated communication channel with the highest estimated expected probability of non-interference and which is not adjacent to an allocated communication channel then in use by the first cellular communication system.

42. The method of claim 40 wherein the set of the allocated communication channels is divided into a plurality of groups, and wherein:

the estimated expected probability of non-interference for an allocated communication channel in a group is based in part on the received signal strength indication measurements for all allocated communication channels in said group.

43. The method of claim 42 wherein the estimated expected probability of non-interference for an allocated communication channel in said group is adjusted by a group improvement factor or a group degradation factor.

44. The method of claim 40 wherein said periodically collected received signal strength indication measurements are collected over an extended period of time and stored in an RSSI database, and wherein said estimated expected probability of non-interference for each allocated communication channel is based upon at least a portion of said collected and stored data.

45. The method of claim 40 wherein said allocated voice channels comprise forward voice channels each operating on a first frequency split and reverse voice channels each operating on a second frequency split and wherein the step of periodically collecting further comprises:

collecting received signal strength indication measurements for each said reverse voice channel on each corresponding first frequency split; and collecting received signal strength indication measurements for each said forward voice channel on each corresponding second frequency split;

wherein said estimated expected probability of non-interference for each allocated voice channel is based on said received signal strength indication measurements collected on said corresponding first and second frequency splits.

46. The method of claim 45 wherein said collected received signal strength indication measurements taken on each first frequency split are recorded over an extended period of time into a first split RSSI database and said collected received signal strength indication measurements taken on each second frequency split are recorded over an extended period of time into a second frequency split RSSI database; and said estimated expected probability of non-interference for each allocated voice channel is based upon at least a portion of said recorded first frequency split received signal strength indication measurements and at least a portion of said recorded second frequency split received signal strength indication measurements.

47. The method of claim 45 wherein said set of allocated voice channels are divided into a plurality of groups; and wherein the estimated expected probability of non-interference for an allocated voice channel in a group is based upon at least a portion of said recorded first frequency split received signal strength indication measurements and at least a portion of said recorded second frequency split received signal strength indication measurements for all allocated voice channels in said group.

48. The method of claim 40 further comprising the steps of:

suspending said periodic collecting step during periods of low activity in said second cellular communication system.

49. The method of claim 44 further comprising the steps of:

determining channel assignment changes in said second cellular communication system;

in response to said determination, suspending said selecting step and deleting said recorded received signal strength indication measurements for all allocated communications channels from said RSSI database and then reactivating said collecting, determining and selecting steps.

50. The method of claim 40 wherein said allocated control channels include one allocated control channel in use by said first cellular communication system and at least one available allocated control channel.

51. The method of claim 50 wherein said selecting step further comprises periodically replacing said one allocated control channel with an available allocated control channel based on the estimated expected probability of non-interference of the available allocated control channels.

52. The method of claim 40 wherein the estimated expected probability of non-interference for an allocated communication channel is based on the received signal strength indication measurements for the allocated communication channel, on the received signal strength indication measurements for an allocated communication channel adjacent to an above the allocated communication channel and on the received signal strength indication measurements for an allocated communication channel adjacent to and below the allocated communication channel.

53. The method of claim 40 wherein said first cellular communication system comprises a cellular auxiliary personal communication system and said second cellular communication system comprises a conventional cellular communication system.

\* \* \* \* \*